(12) United States Patent
Kim

(10) Patent No.: US 7,207,124 B2
(45) Date of Patent: Apr. 24, 2007

(54) CLOTHES DRYING MACHINE

(75) Inventor: Jin Doo Kim, Suwon (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 11/192,073

(22) Filed: Jul. 29, 2005

(65) Prior Publication Data

US 2006/0130358 A1 Jun. 22, 2006

(30) Foreign Application Priority Data

Dec. 20, 2004 (KR) .................. 10-2004-0108928

(51) Int. Cl.
*F26B 11/02* (2006.01)
(52) U.S. Cl. ................... 34/601; 474/135; 200/61
(58) Field of Classification Search .......... 34/601–606; 474/135; 200/61.58, 61
See application file for complete search history.

(56) References Cited

U.S. PATENT DOCUMENTS 3,890,719 A * 6/1975 Braga et al. .................. 34/572
4,488,363 A * 12/1984 Jackson et al. ............... 34/572
6,967,297 B2 * 11/2005 Muller et al. .......... 200/61.58 B
6,996,920 B2 * 2/2006 Bang et al. .................... 34/494

FOREIGN PATENT DOCUMENTS

KR 2002-0062448 A 7/2002

* cited by examiner

*Primary Examiner*—S. Gravini
(74) *Attorney, Agent, or Firm*—Sughrue Mion, PLLC

(57) ABSTRACT

A clothes drying machine having a sensing switch easily installed on a motor bracket for sensing whether or not a belt for rotating a rotary drum is loose or cut. The sensing switch includes a first insertion hole having a longitudinally extended shape and a second insertion hole having a circular shape, and the motor bracket includes first and second insertion members respectively inserted into the first and second insertion holes. An extended portion of the first insertion member has a size and a shape corresponding to those of the first insertion hole so that the sensing switch is fixed without movement when the first insertion member is inserted into the first insertion hole. A flat portion of the second insertion member is provided with a screw hole formed therethrough so that the sensing switch is firmly fixed to the motor bracket by inserting a screw into the second insertion hole and the screw hole.

14 Claims, 5 Drawing Sheets

CLOTHES DRYING MACHINE

CROSS-REFERENCE TO RELATED APPLICATION

This application claims priority from Korean Patent Application No. 2004-108928, filed Dec. 20, 2004, in the Korean Intellectual Property Office, the disclosure of which is incorporated herein by reference.

BACKGROUND OF THE INVENTION

1. Field of the Invention

The present invention relates to a clothes drying machine and, more particularly, to a clothes drying machine in which a sensing switch, for sensing whether or not a belt attached to the outer cylindrical surface of a rotary drum for rotating the rotary drum is loose or cut, is easily installed on a motor bracket.

2. Description of the Related Art

Generally, a clothes drying machine is an apparatus for rapidly drying laundry contained in a rotary drum by rotating the rotary drum at a low speed and supplying hot air to the inside of the rotary drum. Korean Patent Laid-open Publication No. 2002-0062448 discloses one clothes drying machine.

Such a clothes drying machine comprises an air blast fan for forcibly blowing air to the inside of a rotary drum, a driving motor for simultaneously driving the air blast fan and the rotary drum, an inlet channel for guiding the air to be introduced into the rotary drum, and an outlet channel for guiding the air from the rotary drum to be discharged to the outside. A driving pulley for rotating the rotary drum is connected to one end of a rotary shaft extended from both sides of the driving motor, and the air blast fan is connected to the other end of the rotary shaft, thereby allowing the driving motor to simultaneously rotate the air blast fan and the rotary drum.

A belt is wound on the driving pulley such that the driving pulley surrounds the outer cylindrical surface of the rotary drum, and is rotated by the rotation of the driving pulley by the driving motor, thereby rotating the rotary drum.

When the clothes drying machine is used for a long time, the belt becomes loose so that the rotary drum is not rotated in the normal manner, or the belt is cut so that the rotary drum is not rotated at all.

Since the conventional clothes drying machine does not have means for sensing whether or not the belt is loose or cut, the conventional clothes drying machine cannot recognize the fact that the belt is loose or cut, thus being disadvantageous in that inspection and repair of the clothes drying machine cannot be rapidly and efficiently achieved.

SUMMARY OF THE INVENTION

Therefore, one aspect of the invention is to provide a clothes drying machine, which comprises a sensing switch for sensing whether or not a belt for rotating a rotary drum is loose or cut.

Another aspect of the invention is to provide a clothes drying machine, which has a structure such that a sensing switch for sensing whether or not a belt for rotating a rotary drum is loose or cut is easily installed on a motor bracket.

In accordance with one aspect, the present invention provides a clothes drying machine comprising: a rotary drum; a driving motor; a belt wound on an outer cylindrical surface of the rotary drum for transmitting driving force of the driving motor to the rotary drum; and a sensing switch for sensing whether or not the belt is loose or cut.

The sensing switch may be attached to a motor bracket, on which the driving motor is installed.

Further, the sensing switch may include first and second insertion holes diagonally opposite to each other, and the motor bracket may include first and second insertion members respectively inserted into the first and second insertion holes.

The first and second insertion holes may have different shapes. The first insertion hole may have a longitudinally extended shape, and the second insertion hole may have a circular shape.

The first insertion member may include a base portion connected to the motor bracket; and an extended portion having a size smaller than that of the base portion and extended from the base portion, wherein step-wise portions are formed at portions where the base portion and the extended portion meet.

Further, the extended portion may have a size and a shape corresponding to those of the first insertion hole so that the sensing switch contacts the step-wise portions and is fixed without movement when the first insertion member is inserted into the first insertion hole.

The second insertion member having the same length as the distance from the motor bracket to the step-wise portions may be protruded from the motor bracket, and include a flat portion provided with a screw hole formed therethrough so that the sensing switch is firmly fixed to the motor bracket by inserting a screw into the second insertion hole and the screw hole.

The clothes drying machine may further comprise an idle pulley, on which the belt is wound; and a pulley-supporting device, for rotatably supporting the idle pulley, including: an operating member connected to the motor bracket so that first and second ends of the operating member perform a seesaw motion; and a spring, opposite ends of which are respectively connected to the first end of the operating member and the motor bracket, for applying elastic force to pull the idle pulley downwards so that the tension of the belt is reinforced.

The sensing switch may further include a push button located proximate to the second end of the operating member and operative to be pushed by the second end to operate the sensing switch when the second end of the operating member moves upwards by the elastic force of the spring due to the loosening or cutting of the belt.

The clothes drying machine may further comprise an air blast fan for supplying hot air to the rotary drum, wherein the driving motor includes a driving shaft extended from both sides thereof for simultaneously driving the belt and the air blast fan.

BRIEF DESCRIPTION OF THE DRAWINGS

These and/or other aspects and advantages of the invention will become apparent and more readily appreciated from the following description of the exemplary embodiments, taken in conjunction with the accompanying drawings, in which.

Figure 1:
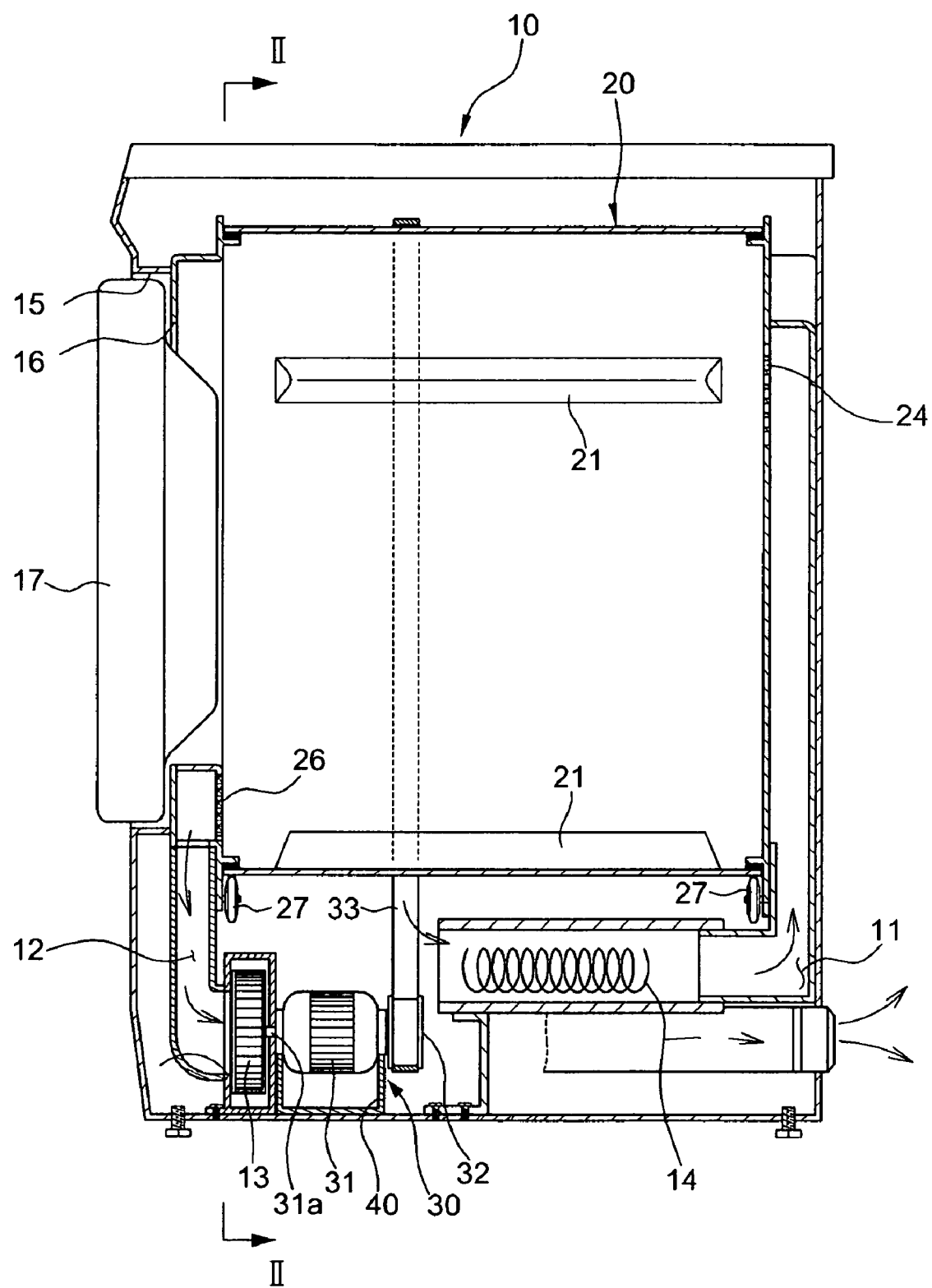
FIG. 1 is a longitudinal sectional of a clothes drying machine consistent with the present invention.

DETAILED DESCRIPTION OF THE ILLUSTRATIVE, NON-LIMITING EMBODIMENTS OF THE INVENTION

Reference will now be made in detail to the illustrative, non-limiting embodiment of the present invention, an example of which is illustrated in the accompanying drawings, wherein like reference numerals refer to like elements throughout. The exemplary embodiment is described below to explain the present invention by referring to the accompanying drawings.

Figure 2:
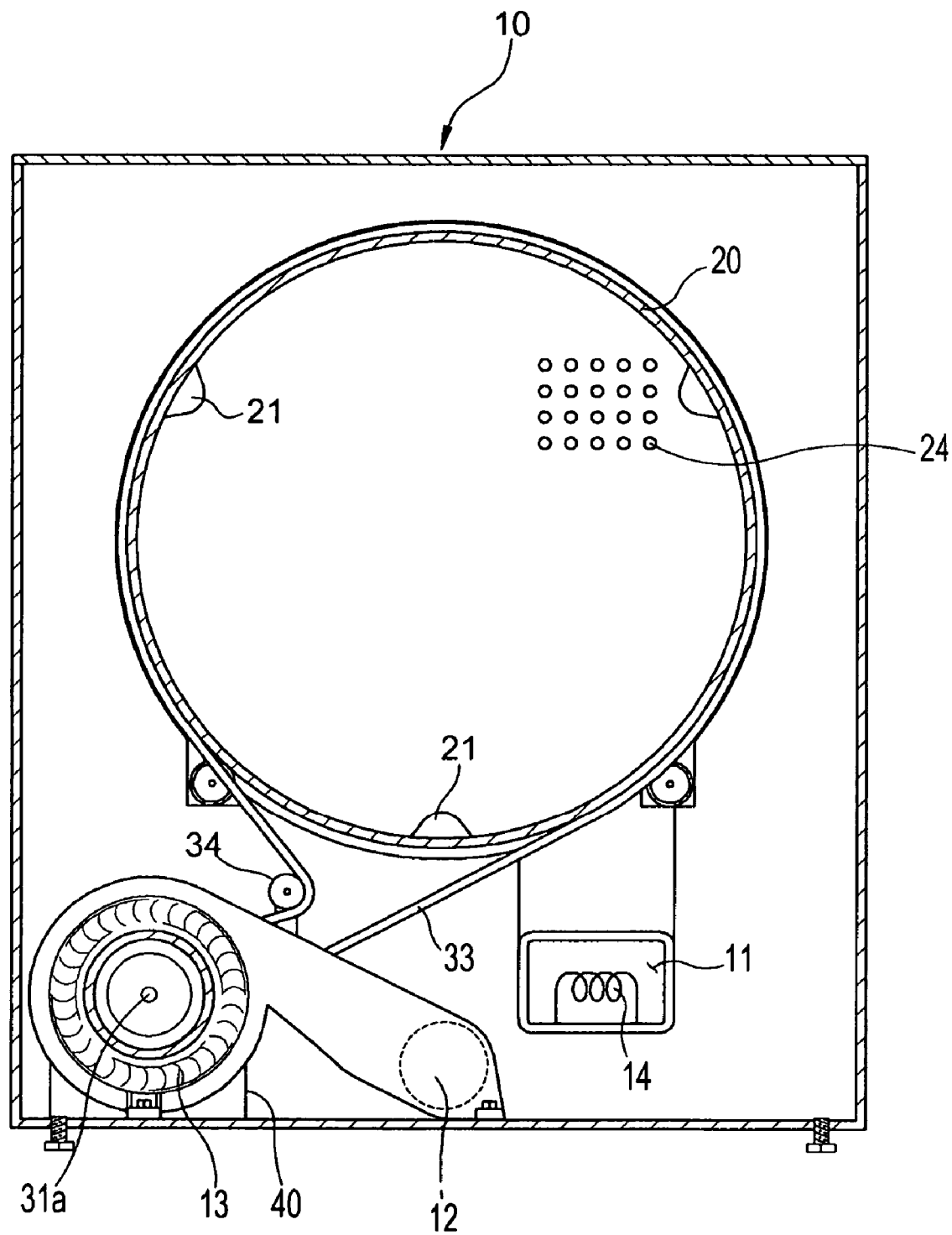
FIG. 2 is a cross sectional view taken along the line II—II of FIG. 1.

FIG. 1 is a longitudinal sectional of a clothes drying machine consistent with the present invention, and FIG. 2 is a cross sectional view taken along the line II—II of FIG. 1.

As shown in FIG. 1, the clothes drying machine consistent with the present invention comprises a rotary drum 20 rotatably installed in a case 10, a driving device 30 for rotating the rotary drum 20, an inlet channel 11 and an outlet channel 12 for guiding outdoor air to circulate through the inside of the rotary drum 20, an air blast fan 13 for forcibly drawing the outdoor air into and through the rotary drum 20, and a heater 14 for heating air supplied to the rotary drum 20 to a high temperature.

The heater 14 is installed in the inlet channel 11 for introducing the outdoor air to the inside of the rotary drum 20 through inlet openings 24, and the air blast fan 13 is installed in the outlet channel 12 for discharging the air, passed through the rotary drum 20 and outlet openings 26, to the outside of the case 10.

The rotary drum 20 includes a plurality of lifters 21 disposed on the inner cylindrical surface thereof and spaced from each other by a designated interval. The lifters 21 lift laundry from the bottom of the rotary drum 20 to the upper portion of the rotary drum 20 and then drop the laundry, thereby allowing the laundry to be efficiently dried by hot air circulating through the inside of the rotary drum 20.

Openings 15 and 16 for putting or taking the laundry into or out of the rotary drum 20 are respectively formed through front surfaces of the case 10 and the rotary drum 20, and a door 17 for opening and closing the openings 15 and 16 is installed on the front surface of the case 10.

The driving device 30 for rotating the rotary drum 20 includes a driving motor 31 installed in the lower portion of the case 10, and a driving pulley 32 and a belt 33 for transmitting the driving force of the driving motor 31 to the rotary drum 20. The belt 33 is wound on the outer cylindrical surface of the rotary drum 20 and the driving pulley 32.

The driving motor 31 is placed on a motor bracket 40 installed on the bottom surface of the case 10. A rotary shaft 31a of the driving motor 31 is extended from both sides of the driving motor 31, one end of the rotary shaft 31a is connected to the air blast fan 13, and the other end of the rotary shaft 31a is connected to the driving pulley 32. Thereby, the driving motor 31 simultaneously drives the air blast fan 13 and the driving pulley 32.

As shown in FIG. 2, the driving device 30 further includes an idle pulley 34 for allowing the belt 33 to have a designated tension so that the rotary drum 20 is smoothly rotated, and a pulley-supporting device 50 (in reference to FIG. 3) for supporting the idle pulley 34 such that the idle pulley 34 is rotatable.

Accordingly, when laundry to be dried is put into the rotary drum 20 and the driving motor 31 and the heater 14 are operated, the driving pulley 32, the belt 33, and the rotary drum 20 are rotated at a low speed by the driving motor 31, and the laundry in the rotary drum 20 is lifted from the bottom of the rotary drum 20 to the upper portion of the rotary drum by the lifters 21 and is then dropped.

Simultaneously, when the air blast fan 13 is operated by the driving motor 31, the outdoor air, introduced into the case 10 through the inlet channel 11, is heated to a high temperature by the heater 14 disposed in the inlet channel 11, and is supplied to the inside of the rotary drum 20, thereby rapidly drying the laundry. Then, the air, circulated through the rotary drum 20, is discharged to the outside of the case 10 through the outlet channel 12.

Figure 3:
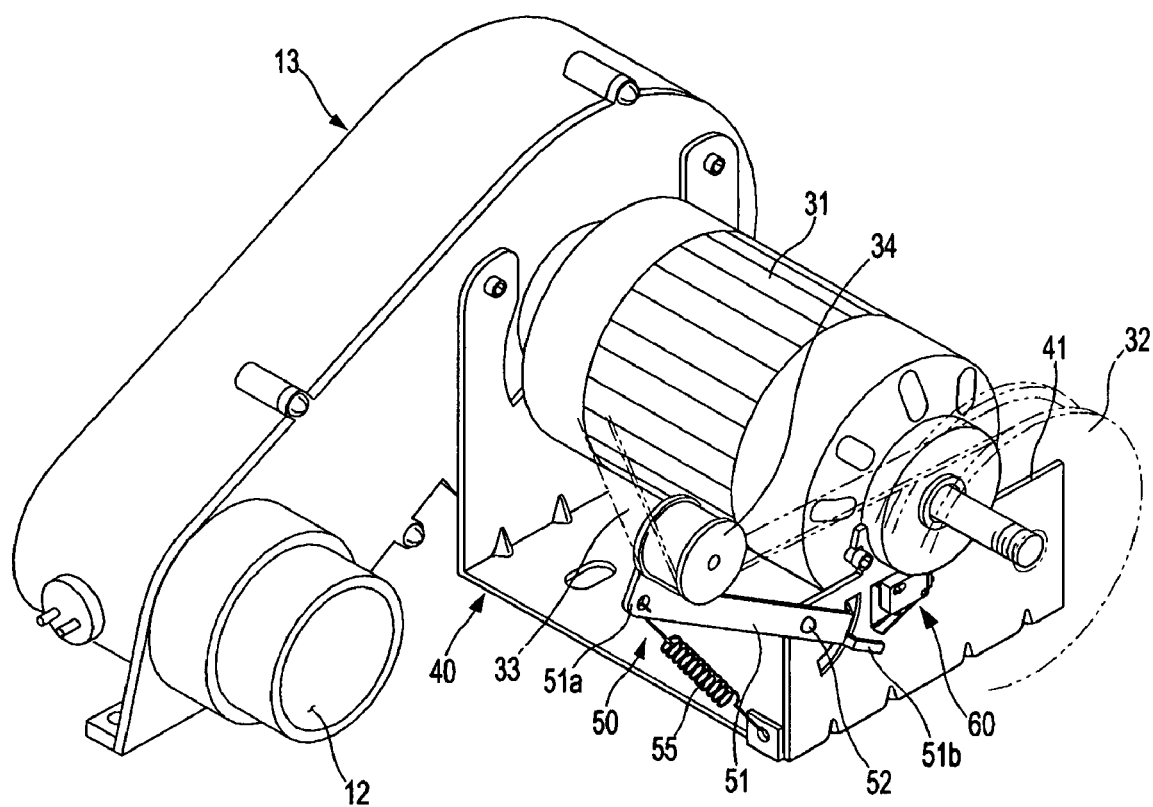
FIG. 3 is a perspective view of a sensing switch, which is installed on a motor bracket, of the clothes drying machine consistent with the present invention.

FIG. 3 is a perspective view of a sensing switch, which is installed on the motor bracket, of the clothes drying machine in accordance with the present invention, illustrating a structure around the driving motor shown from the rear part to the front part of FIG. 2.

As shown in FIG. 3, the pulley-supporting device 50 for supporting the idle pulley 34 such that the idle pulley 34 is rotatable and a sensing switch 60 for sensing whether or not the belt 33 is loose or cut are installed on the motor bracket 40, on which the driving motor 31 is placed.

The pulley-supporting device 50 includes an operating member 51, on which the idle pulley 34 is rotatably installed, and a spring 55 for applying elastic force to pull the operating member 51 downwards so that the belt 33 wound on the idle pulley 34 has a designated tension.

The operating member 51 includes a first end 51a, to which the idle pulley 34 is rotatably connected, and a second end 51b, which is located below the sensing switch 60. A designated point of the operating member 51 close to the second end 51b is hinged to a side panel 41 of the motor bracket 40 by a hinge pin 52 so that the first end 51a and the second end 51b perform a seesaw motion centering on the hinge pin 52.

Since one end of the spring 55 is connected to the first end 51a of the operating member 51, and the other end of the spring 55 is connected to the lower portion of the side panel 41 of the motor bracket 40, the spring 55 applies elastic force to pull the first end 51a of the operating member 51 and the idle pulley 34 downwards, thereby tensioning the belt 33.

In this case, FIG. 3 illustrates the state of the idle pulley 34, which is deviated slightly downwards from a normal position (with reference to FIG. 2) due to the loosening or cutting of the belt 33 just before the second end 51b of the operating member 51 operates the sensing switch 60. In the case that the idle pulley 34 is located at the normal position as shown in FIG. 2, the idle pulley 34 is located below the first end 51a of the operating member 51 and is located above the second end 51b.

Hereinafter, with reference to FIGS. 4 and 5, the installed structure of the sensing switch of the clothes drying machine of the present invention will be described.

Figure 4:
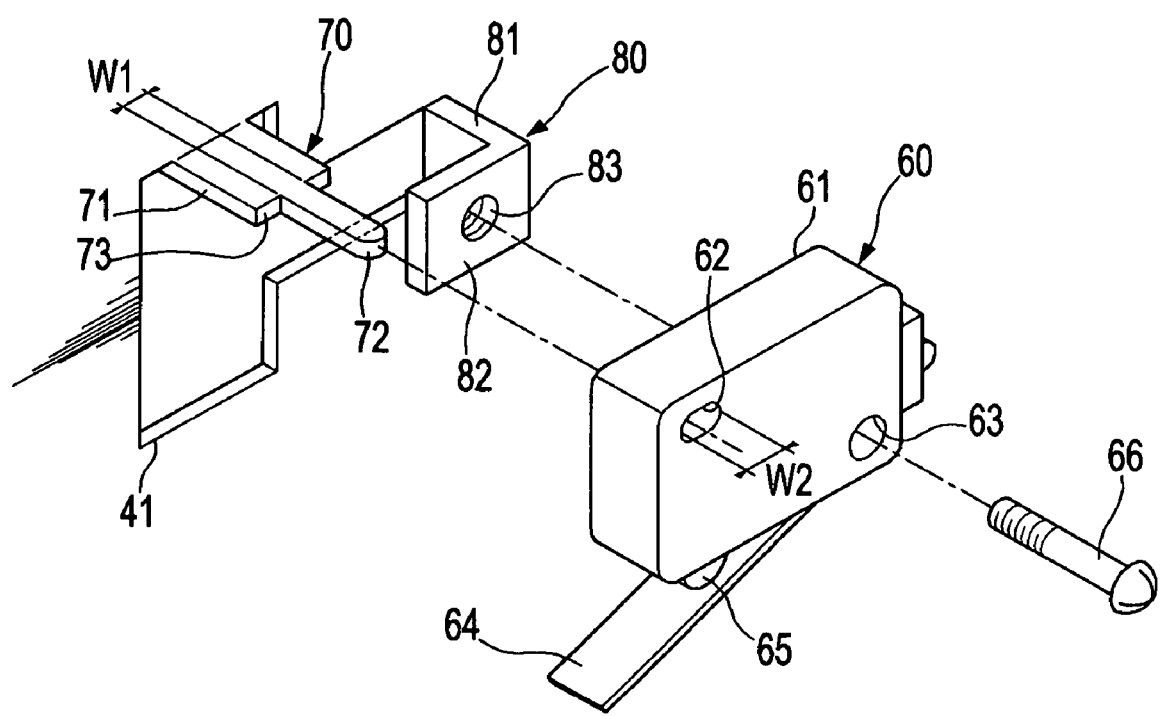
FIG. 4 is a partial perspective view of the motor bracket of FIG. 3, from which the sensing switch is disconnected.
Figure 5:
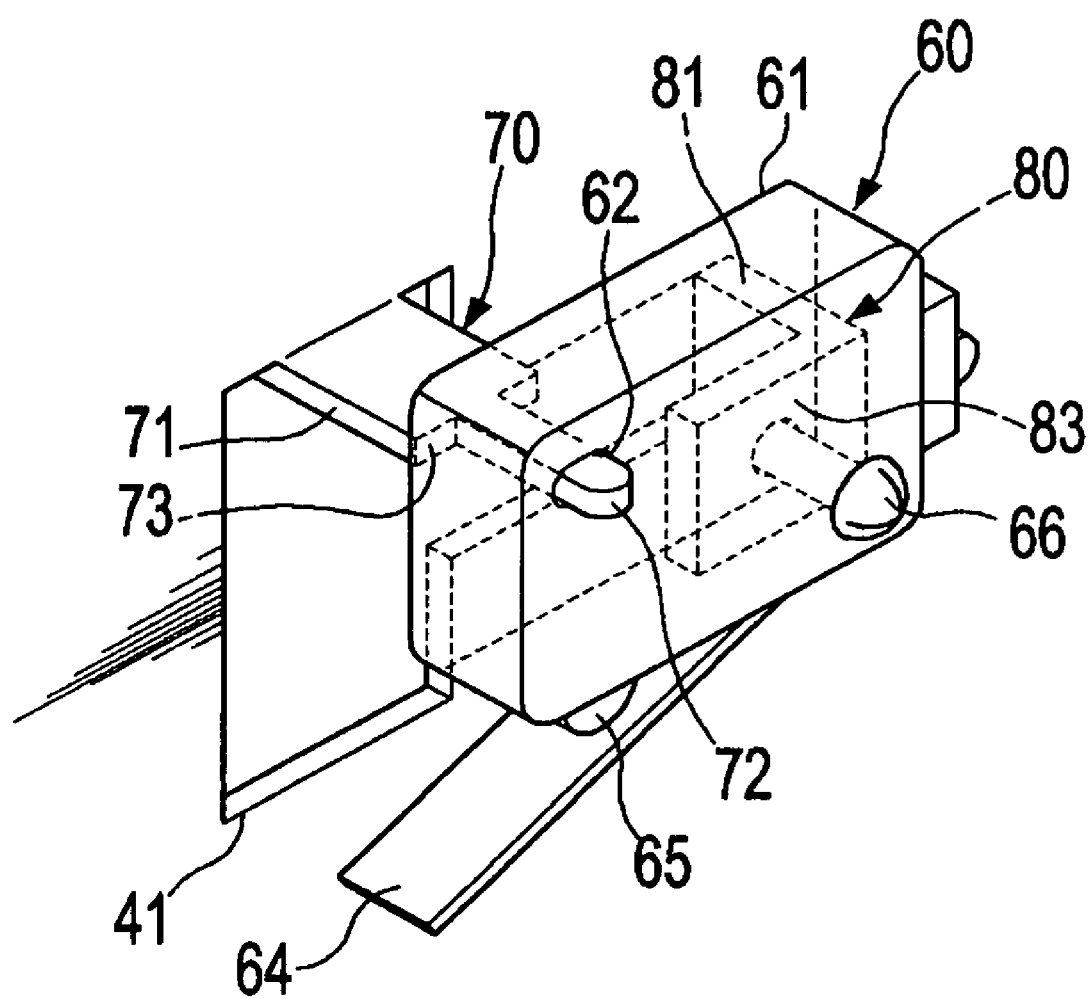
FIG. 5 is a partial perspective view of the motor bracket of FIG. 3, to which the sensing switch is connected.

FIGS. 4 and 5 are partial perspective views of the motor bracket of FIG. 3. More particularly, FIG. 4 illustrates the motor bracket, from which the sensing switch is disconnected, and FIG. 5 illustrates the motor bracket, to which the sensing switch is connected.

As shown in FIG. 4, the sensing switch 60 includes a main body 61 having an approximately cubic structure, first and second insertion holes 62 and 63, which are formed through the main body 61 and are diagonally opposite to each other, a push button 64 connected to the lower portion of the main body 61 and provided with one end, which moves upwards, and a contact point 65 formed on the lower portion of the main body 61 at the inside of the push button 64.

When the second end 51b of the operating member 51 is rotated upwards and presses the push button 64 (with reference to FIG. 3), the free end of the push button 64 moves upwards and presses the contact point 65 into the main body 61 so that the sensing switch 60 is operated. Then, the operation of the sensing switch 60 informs a user of the fact that the belt 33 is loose or cut.

In order to install the sensing switch 60 on the motor bracket 40, first and second insertion members 70 and 80 respectively corresponding to the first and second insertion holes 62 and 63 of the sensing switch 60 are formed on the side panel 41 of the motor bracket 40. The first and second insertion members 70 and 80 are obtained by protruding cut portions of the side panel 41 of the motor bracket 40.

The first insertion member 70 includes a base portion 71 having a designated width protruded perpendicularly from the side panel 41 of the motor bracket 40, and an extended portion 72, having a width W1 smaller than that of the base portion 71, extended from the base portion 71 so as to be inserted into the first insertion hole 62 of the sensing switch 60. Step-wise portions 73 are formed at portions where the base portion 71 and the extended portion 72 meet.

The first insertion hole 62 of the sensing switch 60, into which the extended portion 72 of the first insertion member 70 is inserted, has a longitudinally extended shape the same as that of the extended portion 72, and a width W2 approximately the same as the width W1 of the extended portion 72 so that the sensing switch 60 does not move under the condition that the extended portion 72 is inserted into the first insertion hole 62.

Accordingly, when the extended portion 72 of the first insertion member 70 is inserted into the first insertion hole 62 of the sensing switch 60, the main body 61 of the sensing switch 60 contacts the step-wise portions 73 of the first insertion member 70, and is fixed at a designated position without movement.

The second insertion member 80 includes a vertical portion 81 separated from the first insertion member 70 by a designated interval and protruded perpendicularly from the side panel 41 of the motor bracket 40, and a flat portion 83 extended horizontally from the vertical portion 81 towards the first insertion member 70. A screw hole 83 corresponding to the second insertion hole 63 of the sensing switch 60 is formed through the flat portion 83.

Since the length of the second insertion member 80 protruded from the motor bracket 40 is the same as the distance from the motor bracket 40 to the step-wise portions 73 of the first insertion member 70, the sensing switch 60 is fixed under the condition that the main body 61 of the sensing switch 60 contacts the step-wise portions 73 and the flat portion 82.

Since the second insertion hole 63 of the sensing switch 60 and the screw hole 83 of the second insertion member 80 have circular shapes, differing from the longitudinally extended shapes of the first insertion hole 62 of the sensing switch 60 and the extended portion 72 of the first insertion member 70, it is possible to prevent the first insertion hole 62 from corresponding to the screw hole 83 or the extended portion 72 from being inserted into the second insertion hole 63, thereby allowing the assembly process of the sensing switch 60 to be rapidly achieved and eliminating the probability of abnormally installing the sensing switch 60.

Accordingly, when the sensing switch 60 is fixed by inserting the extended portion 72 of the first insertion member 70 into the first insertion hole 62 of the sensing switch 60 as shown in FIG. 5, the main body 61 of the sensing switch 60 contacts the step-wise portions 73 of the first insertion member 70 and the flat portion 83 of the second insertion member 80, and the second insertion hole 63 of the sensing switch 60 coincides with the screw hole 83 of the second insertion member 80. Thereafter, when a screw 66 is inserted into the second insertion hole 63 and the screw hole 83, the sensing switch 60 is firmly fixed to the side panel 41 of the motor bracket 40.

Although FIG. 5 illustrates the extended portion 72 of the first insertion member 70 having a length larger than the thickness of the sensing switch 60 so that the extended portion 72 is protruded from the first insertion hole 62, the length of the extended portion 72 may be the same as or smaller than the thickness of the sensing switch 60.

As apparent from the above description, the present invention provides a clothes drying machine, which comprises a sensing switch for sensing whether or not a belt is loosened or cut, thereby being simply inspected and repaired.

Further, since the clothes drying machine of the present invention has a structure such that the sensing switch is simply installed on a motor bracket without failure, it is possible to install the sensing switch at low installation and assembly costs.

Although an exemplary embodiment of the invention has been shown and described, it will be appreciated by those skilled in the art that changes may be made in this embodiment without departing from the principles and spirit of the invention, the scope of which is defined in the claims and their equivalents.

What is claimed is:

1. A clothes drying machine comprising:
   a rotary drum;
   a driving motor;
   a belt wound on an outer cylindrical surface of the rotary drum for transmitting driving force of the driving motor to the rotary drum; and
   a sensing switch which senses at least one of a loose state and a cut state of the belt,
   wherein the sensing switch comprises:
     a contact point formed on a lower bottom face portion of the sensing switch; and
     a push button extending above the contact point,
     wherein the push button contacts the contact point upon one of the loose state or the cut state of the belt.

2. The clothes drying machine as set forth in claim 1, wherein the sensing switch is attached to a motor bracket, on which the driving motor is installed.

3. The clothes drying machine as set forth in claim 2, wherein the sensing switch includes first and second insertion holes diagonally opposite to each other, and the motor bracket includes first and second insertion members respectively inserted into the first and second insertion holes.

4. The clothes drying machine as set forth in claim 3, wherein the first and second insertion holes have different shapes.

5. The clothes drying machine as set forth in claim 4, wherein the first insertion hole has a longitudinally extended shape, and the second insertion hole has a circular shape.

6. The clothes drying machine as set forth in claim 3, wherein the first insertion member includes:

a base portion connected to the motor bracket; and an extended portion having a size smaller than that of the base portion and extended from the base portion, wherein step-wise portions are formed at portions where said base portion and said extended portion meet.

7. The clothes drying machine as set forth in claim 6, wherein the extended portion has a size and a shape corresponding to those of the first insertion hole wherein the sensing switch contacts the step-wise portions and is fixed without movement when the first insertion member is inserted into the first insertion hole.

8. The clothes drying machine as set forth in claim 6, wherein the second insertion member having the same length as the distance from the motor bracket to the step-wise portions is protruded from the motor bracket, and includes a flat portion provided with a screw hole formed therethrough wherein the sensing switch is firmly fixed to the motor bracket by inserting a screw into the second insertion hole and the screw hole.

9. The clothes drying machine as set forth in claim 3, further comprising:

an idle pulley, on which the belt is wound; and a pulley-supporting device, which rotatably supports the idle pulley, comprising:

an operating member connected to the motor bracket wherein the first end and the second end of the operating member perform a seesaw motion; and a spring, opposite ends of which are respectively connected to the first end of the operating member and the motor bracket, which applies elastic force to pull the idle pulley downwards reinforcing the tension of the belt.

10. The clothes drying member as set forth in claim 9, wherein the sensing switch further includes a push button located proximate to the second end of the operating member and operative to be pushed by the second end to operate the sensing switch when the second end of the operating member moves upwards by the elastic force of the spring due to the loosening or cutting of the belt.

11. The clothes drying machine as set forth in claim 1, further comprising an air blast fan for supplying hot air to the rotary drum, wherein the driving motor includes a driving shaft extended from both sides thereof for simultaneously driving the belt and the air blast fan.

12. The clothes drying machine according to claim 6, wherein the size of the extended portion of the first insertion member is smaller than the size of the base portion.

13. The clothes drying machine according to claim 9, wherein the second end of the operating member pendulates along a path of travel towards the push button of the sensing switch via a hinge pin upon one of the cut state and the loose state of the belt.

14. The clothes drying machine according to claim 9, wherein the spring comprises a coiled spring.

* * * * *